US011465546B2

(12) United States Patent
Stutesman et al.

(10) Patent No.: US 11,465,546 B2
(45) Date of Patent: Oct. 11, 2022

(54) SLIDE OUT ROLLER

(71) Applicant: Cass Hudson, LLC., Elkhart, IN (US)

(72) Inventors: Darren L. Stutesman, Mishawaka, IN (US); Matthew Jay Larson, Mishawaka, IN (US)

(73) Assignee: Cass Hudson, LLC., Elkhart, IN (US)

( * ) Notice: Subject to any disclaimer, the term of this patent is extended or adjusted under 35 U.S.C. 154(b) by 553 days.

(21) Appl. No.: 16/394,552

(22) Filed: Apr. 25, 2019

(65) Prior Publication Data
US 2020/0339026 A1 Oct. 29, 2020

(51) Int. Cl.
*B60P 3/34* (2006.01)
*E04B 1/343* (2006.01)

(52) U.S. Cl.
CPC ............. *B60P 3/34* (2013.01); *E04B 1/3431* (2013.01)

(58) Field of Classification Search
CPC .................... B60P 3/34; E04B 1/3431
USPC ......... 296/165, 171, 172, 175, 26.09, 26.13; 16/91
See application file for complete search history.

(56) References Cited

U.S. PATENT DOCUMENTS

| 6,868,638 B1* | 3/2005 | Gardner | E04B 1/34336 384/57 |
| 8,066,314 B2* | 11/2011 | Tamura | B60R 5/04 296/26.09 |
| 8,608,227 B2* | 12/2013 | Garceau | B60P 3/34 296/156 |
| 9,604,564 B1* | 3/2017 | Pellicer | B60P 3/39 |

* cited by examiner

Primary Examiner — Joseph D. Pape
(74) Attorney, Agent, or Firm — Crump Law P.C.

(57) ABSTRACT

The slide-out roller consists of an inner thermoplastic core and a semi-rigid over-molded urethane cover with the Inner core having two sets of radially spaced recessed channels formed in its outer surface. The over-molded cover wraps the outer surface of the inner core and fully impregnates the recessed channels, which allows the cover to interdigitate and structurally integrate with the inner core to prevent slippage and drift.

10 Claims, 4 Drawing Sheets

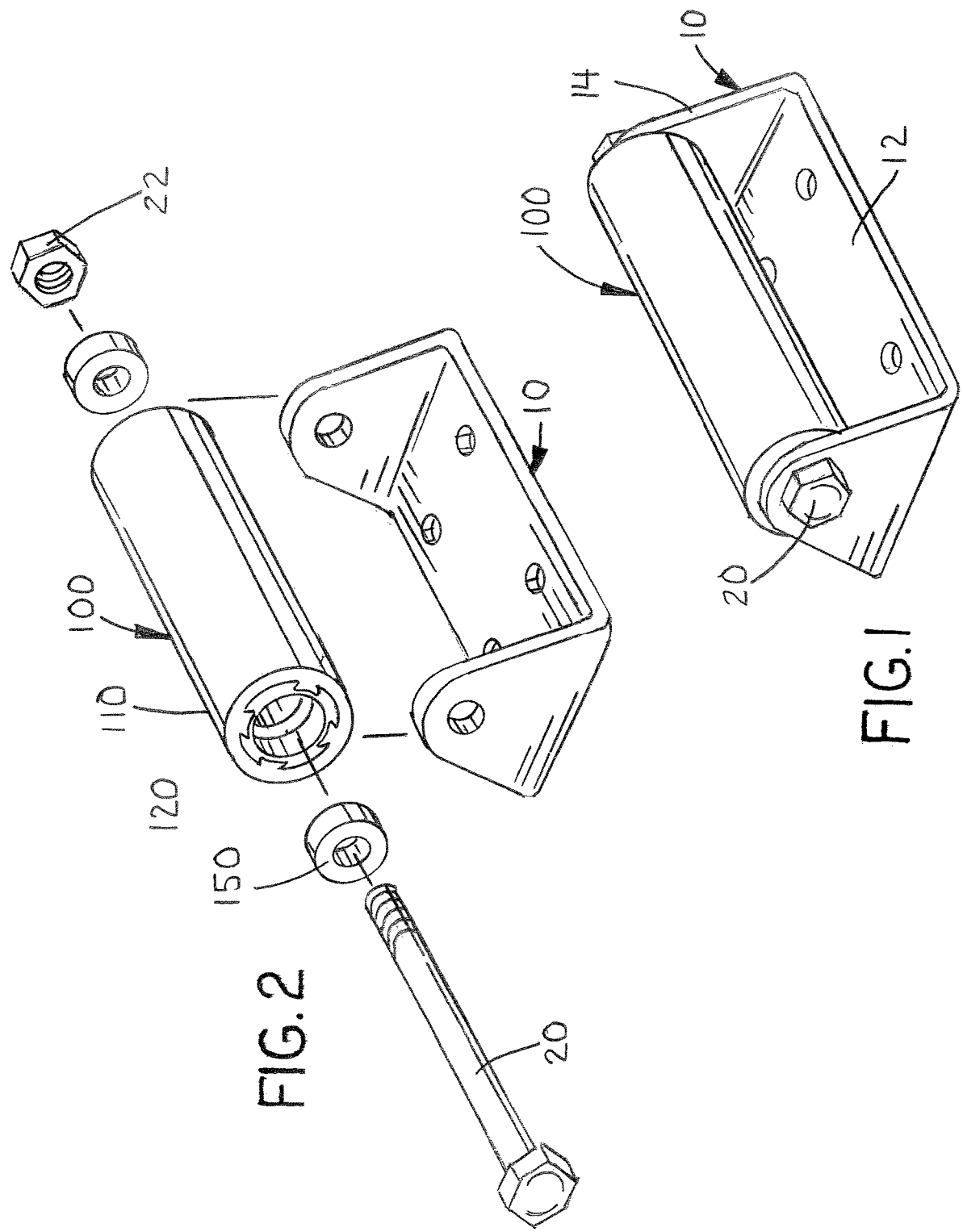

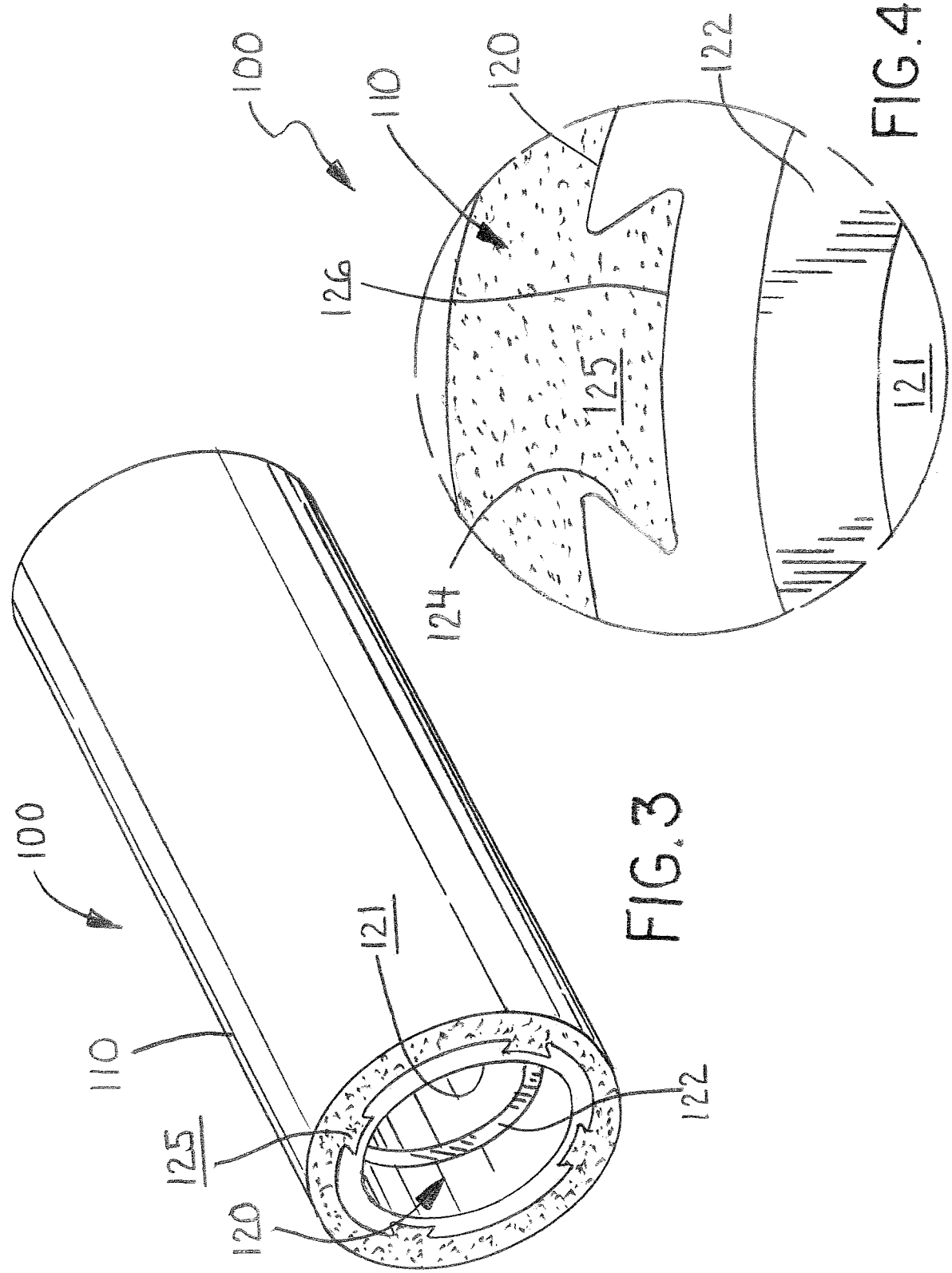

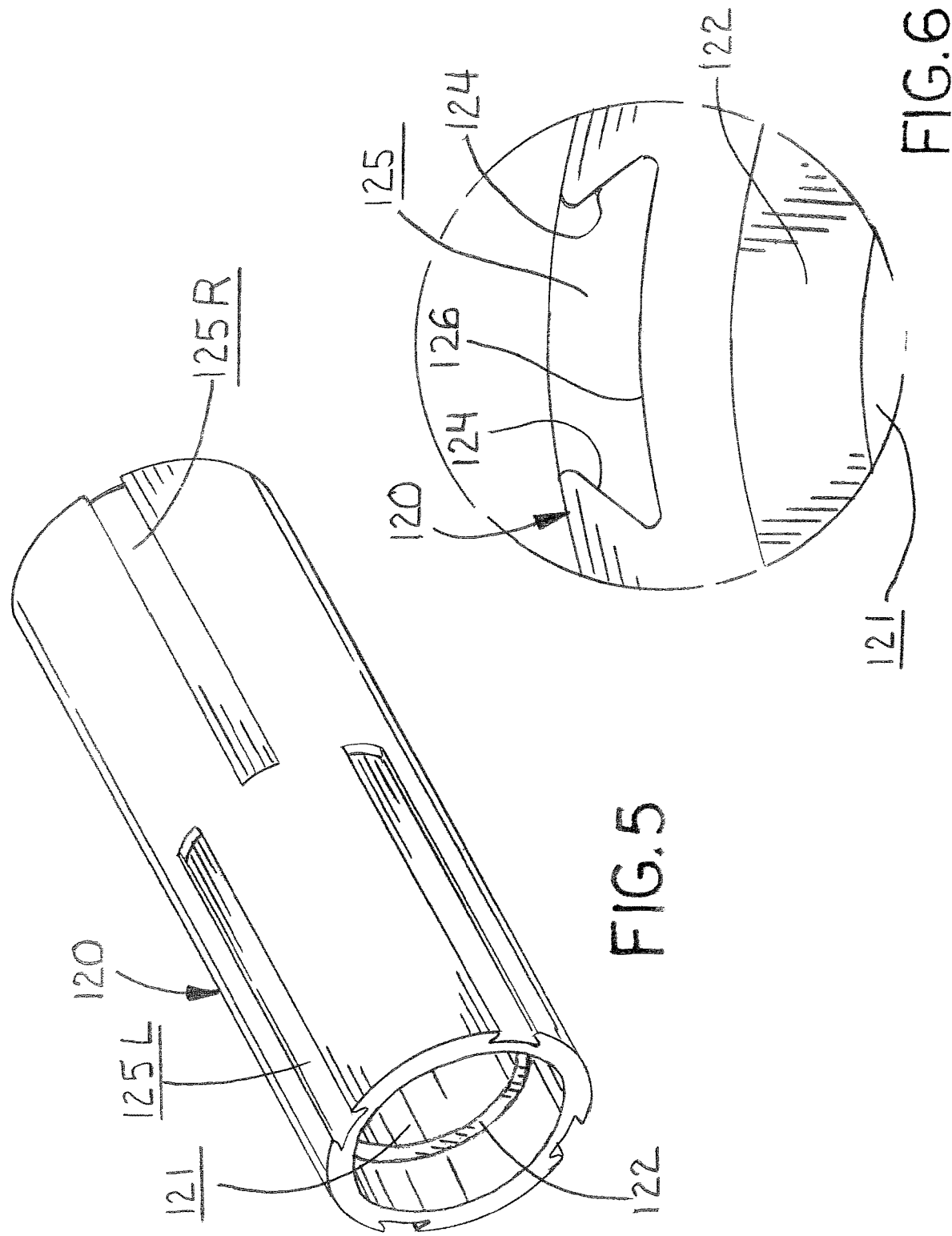

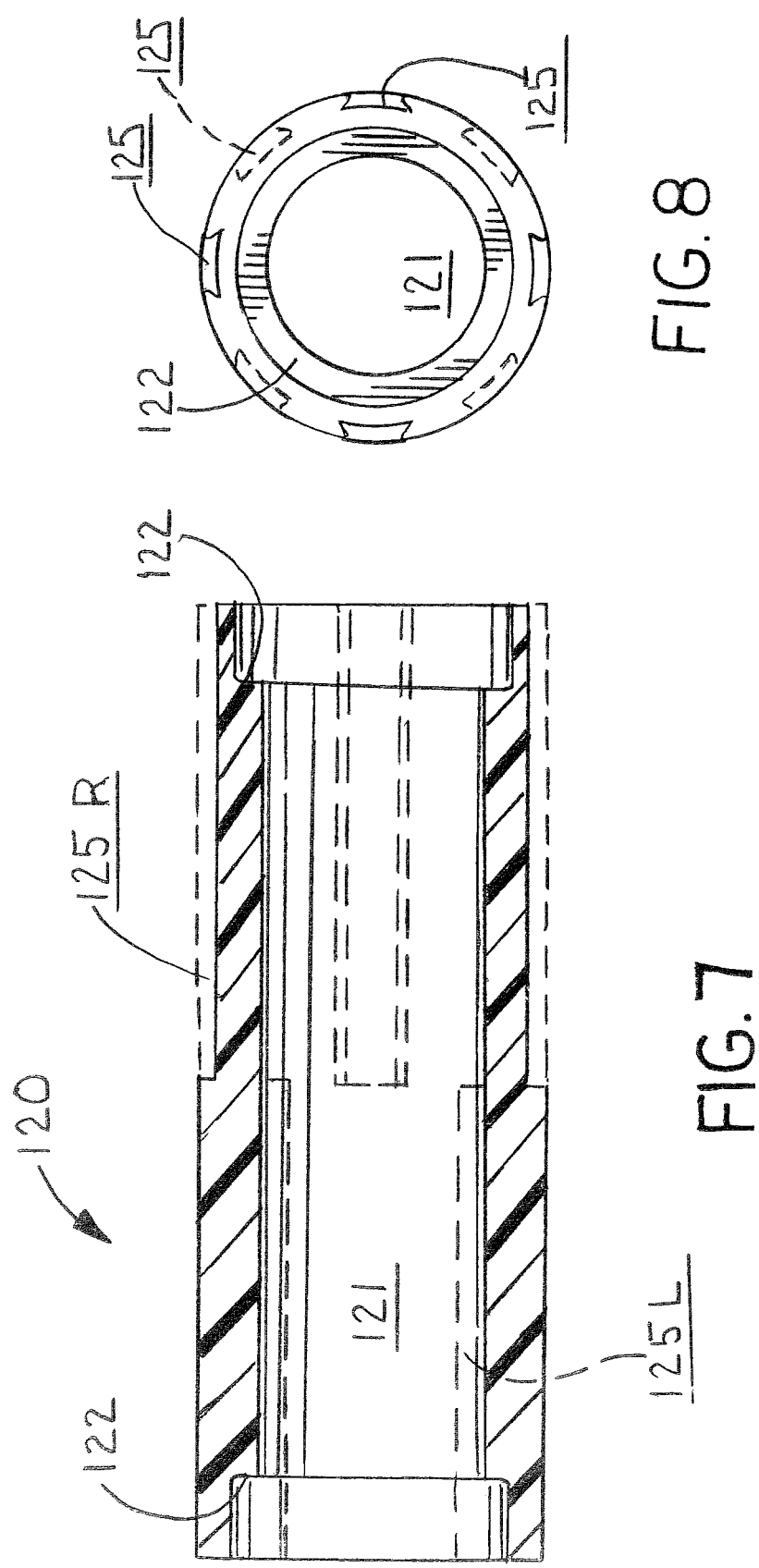

SLIDE OUT ROLLER

This invention relates to a roller for a roller assembly used to support or carry slide-out rooms as they extend and retract.

BACKGROUND AND SUMMARY OF THE INVENTION

Mobile living quarters, such as recreational vehicles and manufactured housing, are commonly equipped with slide-out rooms, which can be extended to create additional living space and retracted to reduce the space during transportation. It is important that the slide-out room retract and extend smoothly and not damage the flooring of the living quarters. Consequently, slide-out mechanisms use roller assemblies to support and carry the slide-out rooms.

Conventional slide-out rollers often use a two-piece over-molded or press fit design that includes a hard thermoplastic core and a semi-rigid over-molded covering. Even though integrally molded to the inner hub or core, the bond between the overmolded covering and inner core would often, heretofore, fail over time resulting in "slippage" (rotation relative to the inner hub) and drift (lateral shift about the hub). Slippage and drift rapidly decrease the longeity of the rollers and diminish the efficiency of the slide-out mechanism.

The slide-out roller of this invention consists of an inner thermoplastic core and a durable over-molded urethane cover with the Inner core having two sets of radially spaced recessed channels formed in its outer surface. The over-molded cover wraps the outer surface of the inner core and fully impregnates the recessed channels, which allows the cover to interdigitate and structurally integrate with the inner core to prevent slippage and drift.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 1 is an exploded view of a roller assembly using an exemplary embodiment of the roller of this invention;

FIG. 2 is a perspective view of the roller assembly of FIG. 1;

FIG. 3 is a perspective view of the roller of FIG. 1;

FIG. 4 is a partial sectional end view of the roller of FIG. 1;

FIG. 5 is a perspective view of the inner core of the roller of FIG. 1;

FIG. 6 is a partial sectional end view of the inner core of the roller of FIG. 1;

FIG. 7 is a sectional side view of the inner core of the roller of FIG. 1; and FIG. 8 is a sectional end view of the inner core of the roller of FIG. 1.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-8 illustrate an exemplary embodiment of the slide-out roller of this invention, which is designated generally as reference numeral 100. As shown, roller 100 is incorporated into a roller assembly that includes a conventional support bracket 10 that rotatably carries the roller. Support brackets are used to mount the roller assembly to the floor of a slide-out room or to the floor of the main living area of the structure. Typically, support brackets are formed or pressed from a suitable sheet metal, but may be constructed of other materials in alternative embodiments. As shown, support bracket 10 has a flat back 12 and opposed bracket ends 14. Roller 110 is rotatably carried by support bracket 10 and rotates about a bolt shaft 20 that extends axially through the roller and holes in bracket ends 14, which is secured by a hex nut 22. Bracket back 12 has a plurality of bores, which allow roller assembly 100 to be affixed to slide-out floor or main floor as desired.

Roller 100 is a cylindrical two-piece over-molded roller that consists of an inner thermoplastic core 120 and an semi-rigid over-molded urethane cover 110. Inner core 120 is molded or formed from a suitable thermoplastic material with a low friction coefficient, such as a nylon or similar material. Cover 110 is composed of a suitable urethane material selected to provide a durable yet tactile outer roller surface. The material used in cover 110 is also selected to be resilient and not mark or mar the floor of any contacting surfaces. Cover 110 is over-molded around inner core 120.

Inner core 120 has an axial shaft bore for receiving bolt shaft 120. The ends of the shaft bore are recessed forming an inner shoulder 22 to accommodate a pair of spanners or bearings 150. Inner core 120 has two sets of four radially spaced recessed channels 113R and 113L formed at opposed ends of its outer surface. Each channel 125 has a dove-tailed cross section formed by diverging side walls 124 and a bottom wall 126 (FIGS. 4,6 and 8). The cross section of channels 125 may take other shapes in alternative embodiments. Channels 125R extend axially across approximately half the length of inner core 120 and radially around the circumference of inner core 120 spaced ninety degrees (90°) apart. Similarly, channels 125L extend axially across approximately half the length of inner core 120 and radially around the circumference of inner core 120 spaced ninety degrees (90°) apart, but are offset by forty-five degrees (45°) from channels 125R. Cover 110 covers the outer surface of inner core 120 and fully impregnates channels 125. Channels 125 allow cover 110 to interdigitate and structurally integrate with inner core 120, which prevents slippage and drift of the cover relative to the core. Roller 100 is constructed using conventional over-molding methods and techniques, which allow the cover materials to impregnate and fill channels 125, as well as, uniformly envelop the outer surface of inner core 120.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A roller for a roller assembly used to support or carry slide-out rooms, the roller comprising:
    an inner core adapted to rotateably mount to a support frame; and
    an integral cover around the inner core,
    the inner core has two opposed ends and a cylindrical outer surface thereof, the inner core also having a plurality of recessed channels formed in the outer surface, the integral cover impregnates the plurality of channels allowing the cover to interdigitate and structurally integrate with the inner core,
    the plurality of channels include a first set of recessed channels formed in the outer surface spaced radially around the outer surface and a second set of recessed channels formed in the outer surface spaced radially around the outer surface, the first set of recessed channels extends longitudinally from one of the two opposed ends, the second set of recessed channels extends longitudinally from the other of the two opposed ends.

2. The roller of claim 1 wherein the first set of recessed channels is offset radially from the second set of recessed channels.

3. The roller of claim 1 wherein the plurality of recessed channels has a dove-tail cross-section.

4. The roller of claim 1 wherein the inner core has an axial bore for receiving a shaft therethrough.

5. The roller of claim 4 wherein the inner core has an annular recess around the axial bore for receiving a bearing.

6. A roller assembly used to support or carry slide-out rooms comprising:
    a support frame; and
    a cylindrical roller rotatably carried by a shaft mounted to the support frame,
    the roller includes an inner core adapted to rotateably mount to a support frame, and an integral cover around the inner core,
    the inner core has two opposed ends and a cylindrical outer surface thereof, the inner core also having a plurality of recessed channels formed in the outer surface, the integral cover impregnates the plurality of channels allowing the cover to interdigitate and structurally integrate with the inner core,
    the plurality of channels includes a first set of recessed channels formed in the outer surface spaced radially around the outer surface and a second set of recessed channels formed in the outer surface spaced radially around the outer surface, the first set of recessed channels extends longitudinally from one of the two opposed ends, the second set of recessed channels extends longitudinally from the other of the two opposed ends.

7. The roller of claim 6 wherein the first set of recessed channels is offset radially from the second set of recessed channels.

8. The roller of claim 6 wherein the plurality of recessed channels has a dove-tail cross-section.

9. The roller of claim 6 wherein the inner core has an axial bore for receiving a shaft therethrough.

10. The roller of claim 9 wherein the inner core has an annular recess around the axial bore for receiving a bearing.

* * * * *